(12) United States Patent
Seo et al.

(10) Patent No.: US 9,480,060 B2
(45) Date of Patent: Oct. 25, 2016

(54) METHOD BY WHICH A TERMINAL RECEIVES ENHANCED DOWNLINK CONTROL CHANNEL IN WIRELESS COMMUNICATION SYSTEM AND APPARATUS FOR SAME

(71) Applicant: LG ELECTRONICS INC., Seoul (KR)

(72) Inventors: Daewon Seo, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/427,948

(22) PCT Filed: Sep. 11, 2013

(86) PCT No.: PCT/KR2013/008210
§ 371 (c)(1),
(2) Date: Mar. 12, 2015

(87) PCT Pub. No.: WO2014/042423
PCT Pub. Date: Mar. 20, 2014

(65) Prior Publication Data
US 2015/0223211 A1    Aug. 6, 2015

Related U.S. Application Data

(60) Provisional application No. 61/701,718, filed on Sep. 16, 2012.

(51) Int. Cl.
*H04W 4/00* (2009.01)
*H04W 72/04* (2009.01)
*H04L 27/26* (2006.01)
*H04L 5/00* (2006.01)
*H04L 5/14* (2006.01)
*H04W 72/00* (2009.01)

(52) U.S. Cl.
CPC .......... *H04W 72/042* (2013.01); *H04L 5/0048* (2013.01); *H04L 5/0051* (2013.01); *H04L 5/0053* (2013.01); *H04L 27/2601* (2013.01); *H04W 72/0446* (2013.01); *H04L 5/0023* (2013.01); *H04L 5/1469* (2013.01); *H04W 72/00* (2013.01)

(58) Field of Classification Search
None
See application file for complete search history.

(56) References Cited

U.S. PATENT DOCUMENTS

2009/0323625 A1  12/2009  Lee et al.
2010/0103901 A1  4/2010  Miki et al.
(Continued)

FOREIGN PATENT DOCUMENTS

KR  10-2008-0083587 A  9/2008
KR  10-2009-0099006 A  9/2009
WO  WO 2012/118270 A1  9/2012

*Primary Examiner* — Phirin Sam
(74) *Attorney, Agent, or Firm* — Birch, Stewart, Kolasch & Birch, LLP

(57) ABSTRACT

The present invention relates to a method by which a terminal receives an enhanced downlink control channel in a wireless communication system, and to an apparatus for same. In detail, the method for detecting downlink control information includes the steps of receiving information about a specific subframe for an enhanced physical downlink control channel (EPDCCH), and monitoring the determined number of resource blocks according to available resource regions of the specific subframe in order to detect downlink control information, wherein, when the available resource region is restricted, the number of resource blocks is increased.

11 Claims, 11 Drawing Sheets

(56) References Cited

U.S. PATENT DOCUMENTS

| | | |
|---|---|---|
| 2010/0165847 A1 | 7/2010 | Kamuf et al. |
| 2012/0054258 A1 | 3/2012 | Li et al. |
| 2013/0194931 A1* | 8/2013 | Lee ................ H04L 5/0053 370/241 |
| 2013/0252606 A1* | 9/2013 | Nimbalker ........... H04B 17/309 455/434 |
| 2014/0003349 A1 | 1/2014 | Kang et al. |
| 2015/0043457 A1* | 2/2015 | Liu ..................... H04B 7/024 370/329 |

* cited by examiner (a) control-plane protocol stack (b) user-plane protocol stack (A)

(B)

(A)

(B)

METHOD BY WHICH A TERMINAL RECEIVES ENHANCED DOWNLINK CONTROL CHANNEL IN WIRELESS COMMUNICATION SYSTEM AND APPARATUS FOR SAME

CROSS REFERENCE TO RELATED APPLICATIONS

This application is the National Phase of PCT International Application No. PCT/KR2013/008210, filed on Sep. 11, 2013, which claims priority under 35 U.S.C. 119(e) to U.S. Provisional Application No. 61/701,718, filed on Sep. 16, 2012, all of which are hereby expressly incorporated by reference into the present application.

TECHNICAL FIELD

The present invention relates to wireless communication system, and more particularly, to a method for enabling a user equipment to receive an enhanced downlink control channel in a wireless communication system and an apparatus for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the conventional problem is to provide a method for enabling a user equipment to receive an enhanced downlink control channel in a wireless communication system and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for enabling a user equipment to receive downlink control information in a wireless communication system comprises the steps of receiving information on a specific subframe for an enhanced physical downlink control channel (EPDCCH); and receiving the downlink control information by monitoring the number of resource blocks determined in accordance with available resource regions of the specific subframe, wherein, when the available resource regions are restricted, the number of resource blocks is increased.

Moreover, the information on the specific subframe is received through higher layer signaling.

Moreover, when the resource regions are restricted, the resource blocks are configured in accordance with a distributed mode.

Moreover, antenna ports allocated in association with the resource blocks are configured in accordance with a localized mode or a distributed mode.

Moreover, if the available resource regions are restricted, the number of the resource blocks is additionally increased on the basis of a predetermined value defined in accordance with an aggregation level, or is increased to a multiple of the number of available orthogonal frequency division multiplexing (OFDM) symbols.

Moreover, the information on the specific subframe includes at least one of the number of OFDM symbols for the EPDCCH, the number of the resource blocks, and locations of the resource blocks.

Moreover, a location of a demodulation reference signal (DM-RS) at the specific subframe number is changed if the available resource regions are restricted.

Moreover, the resource regions include at least one OFDM symbol.

Moreover, the specific subframe includes at least one of a downlink pilot time slot (DwPTS), a positioning reference signal (PRS), and a physical multicast channel (PMCH).

To solve the aforementioned technical problems, according to another aspect of the present invention, a user equipment for receiving downlink control information in a wireless communication system comprises a radio frequency (RF) unit; and a processor, wherein the processor is configured to receive information on a specific subframe for an enhanced physical downlink control channel (EPDCCH) and receive the downlink control information by monitoring the number of resource blocks determined in accordance with available resource regions of the specific subframe, and when the available resource regions are restricted, the number of resource blocks is increased.

Advantageous Effects

According to the present invention, downlink control information of the user equipment may effectively be detected in the wireless communication system.

It will be appreciated by persons skilled in the art that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
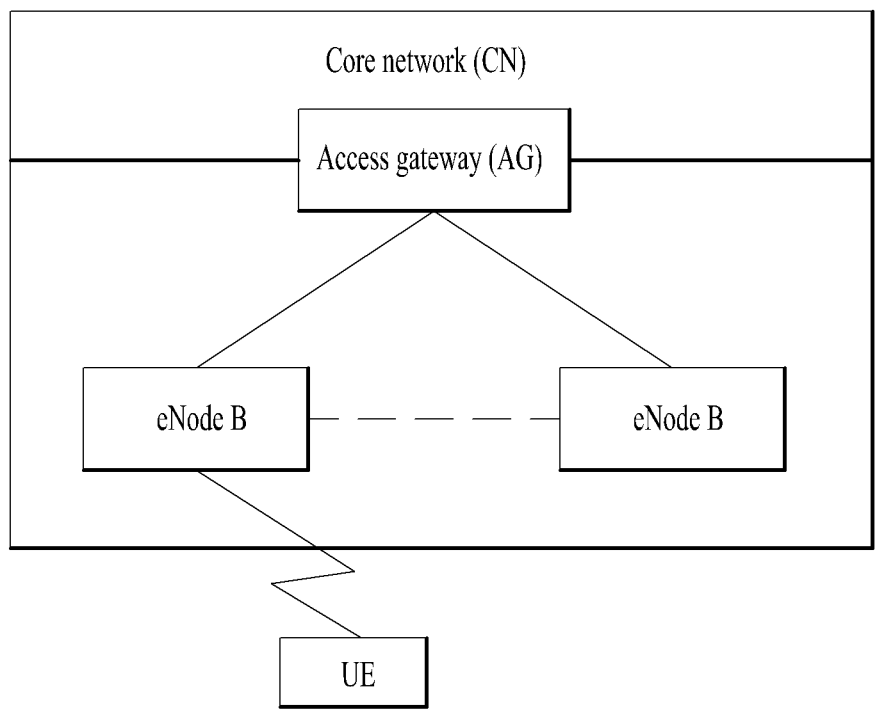
FIG. 1 is a diagram illustrating a network structure of an Evolved Universal Mobile Telecommunications System (E-UMTS) which is an example of a wireless communication system.
Figure 2:
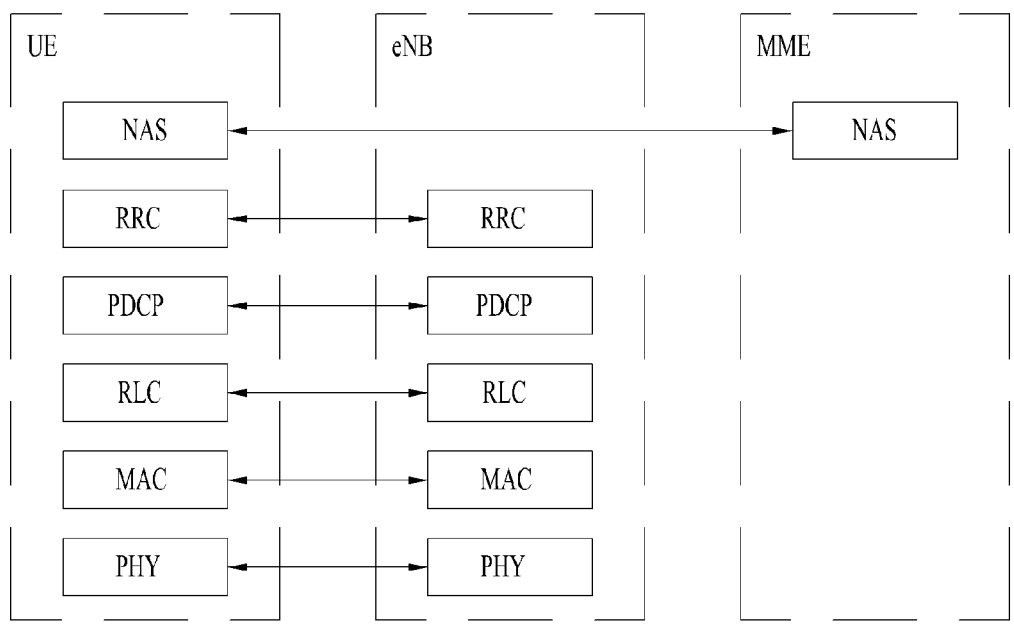
FIG. 2 is a diagram illustrating structures of a control plane and a user plane of a radio interface protocol between a user equipment and an E-UTRAN based on the 3GPP radio access network standard.
Figure 2:
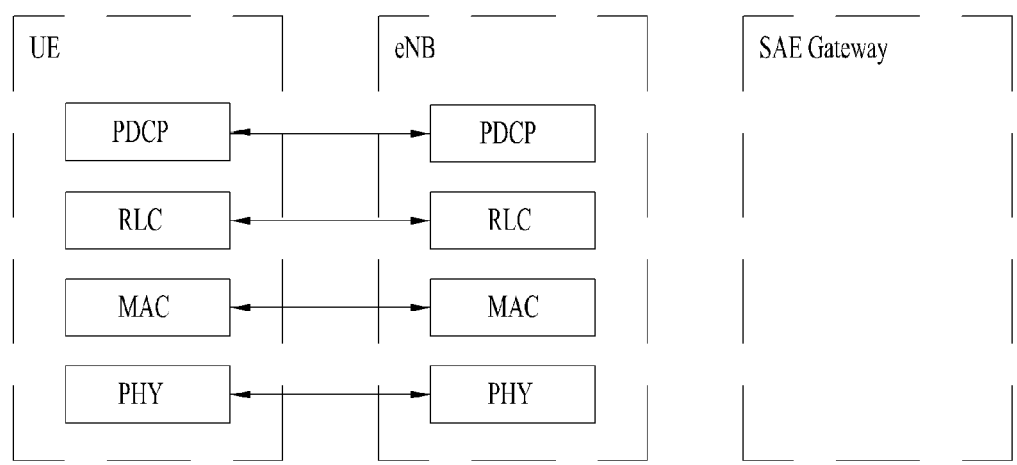

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
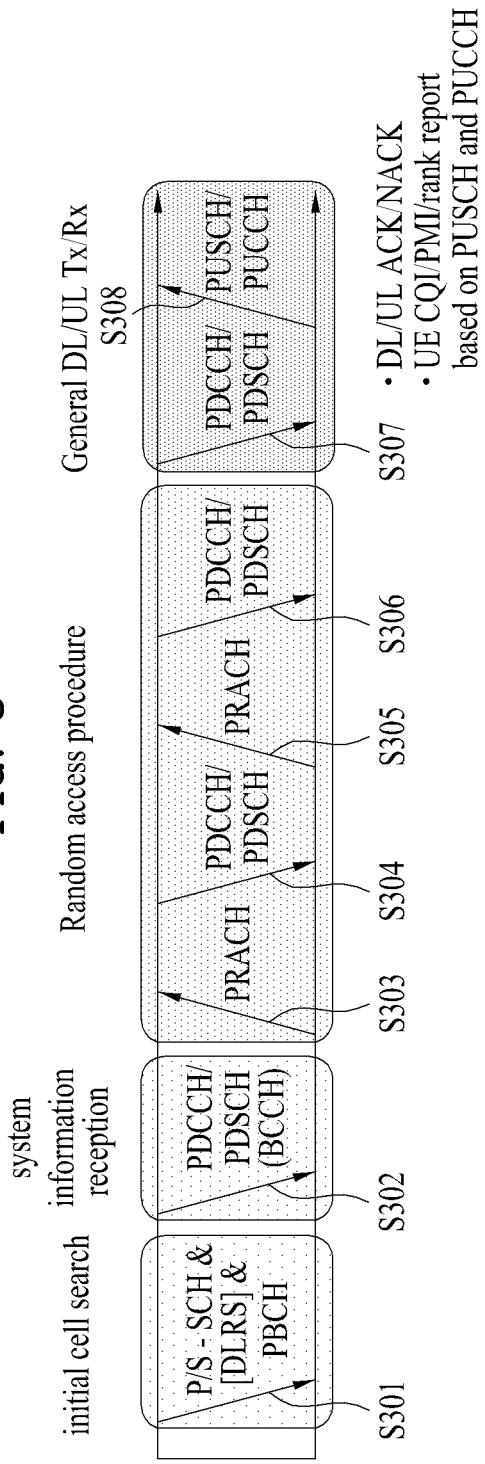
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
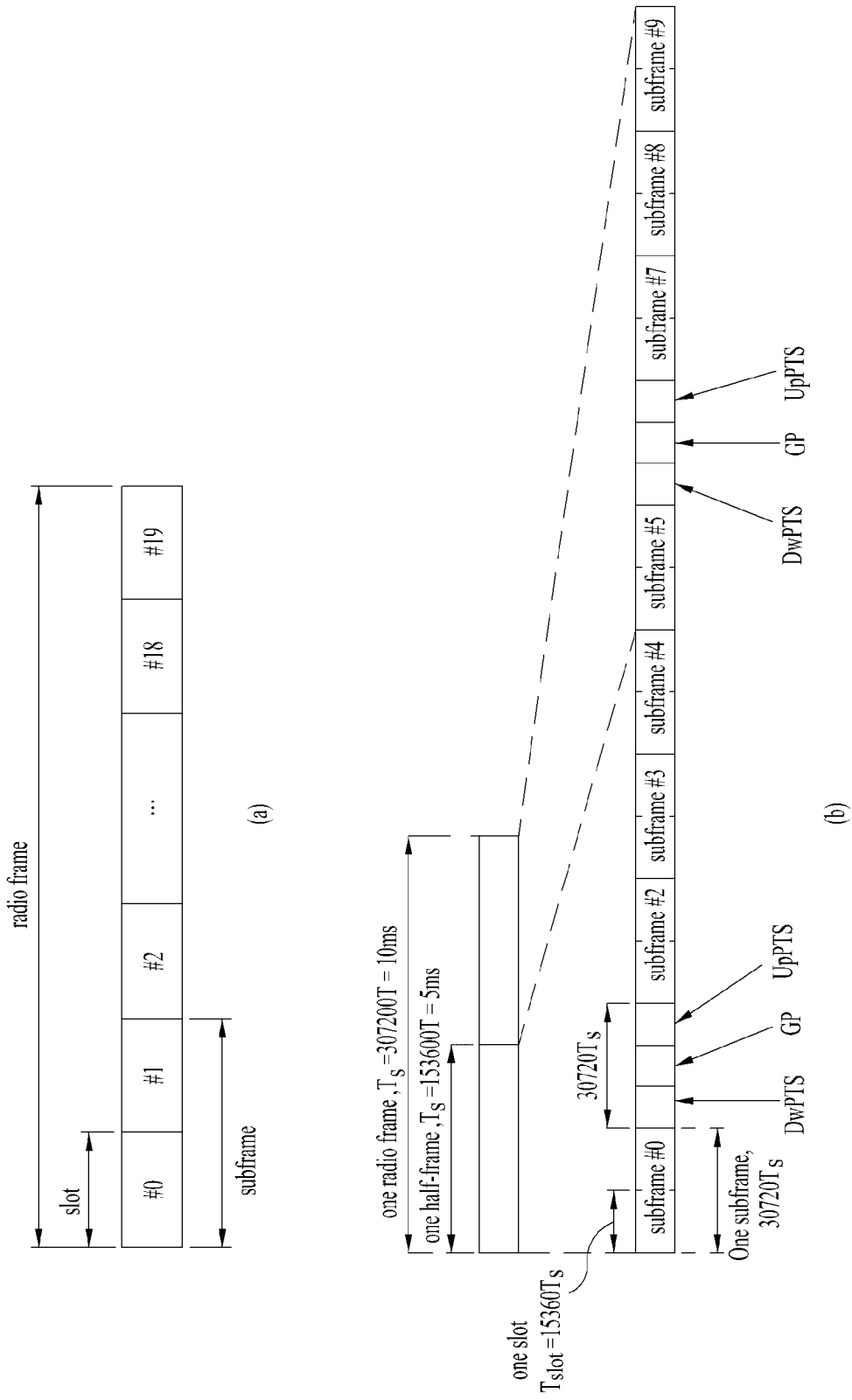
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP).

Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
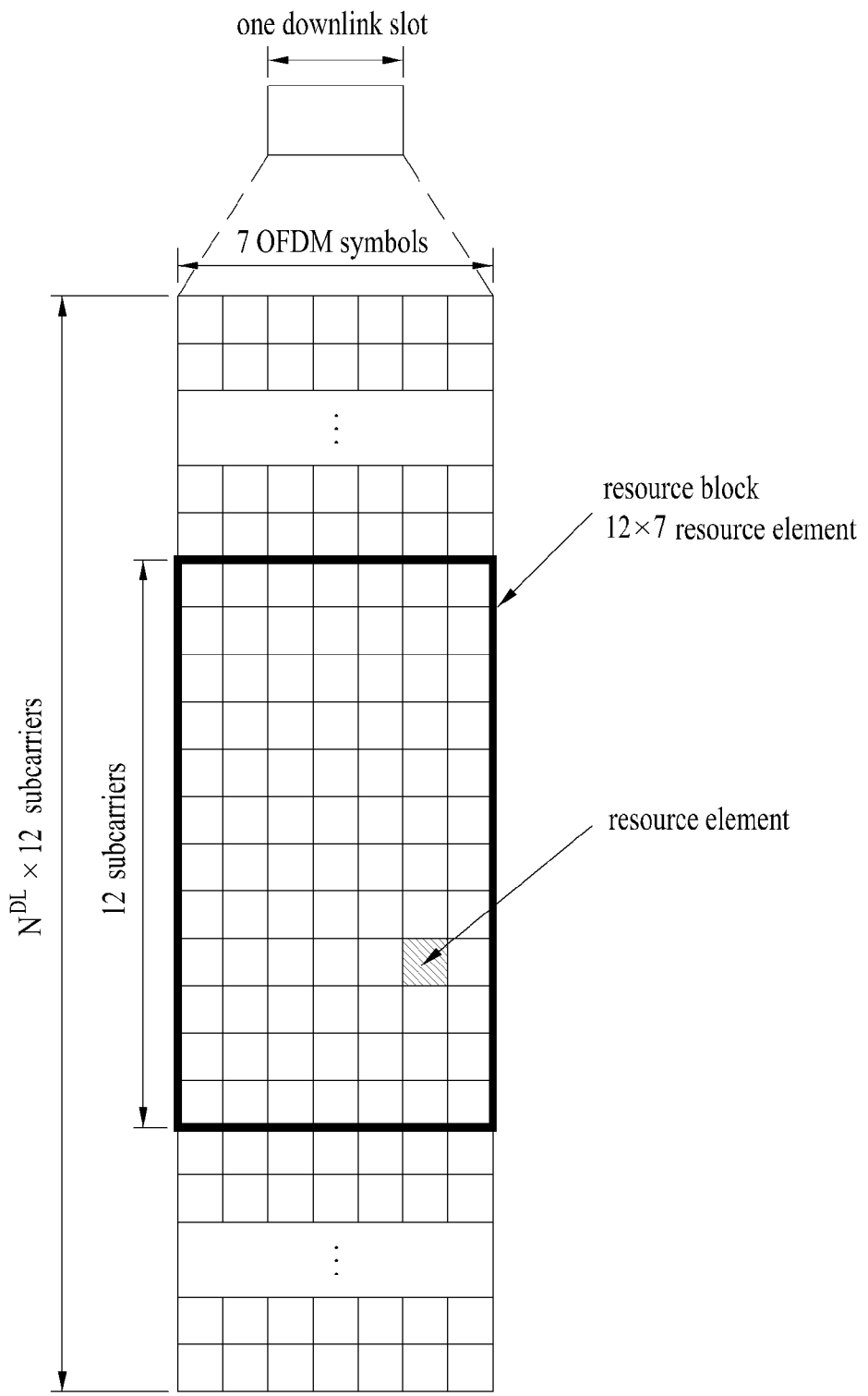
FIG. 5 is a diagram illustrating an example of a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes 5 subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

TABLE 1

| | | Normal cyclic prefix in downlink | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
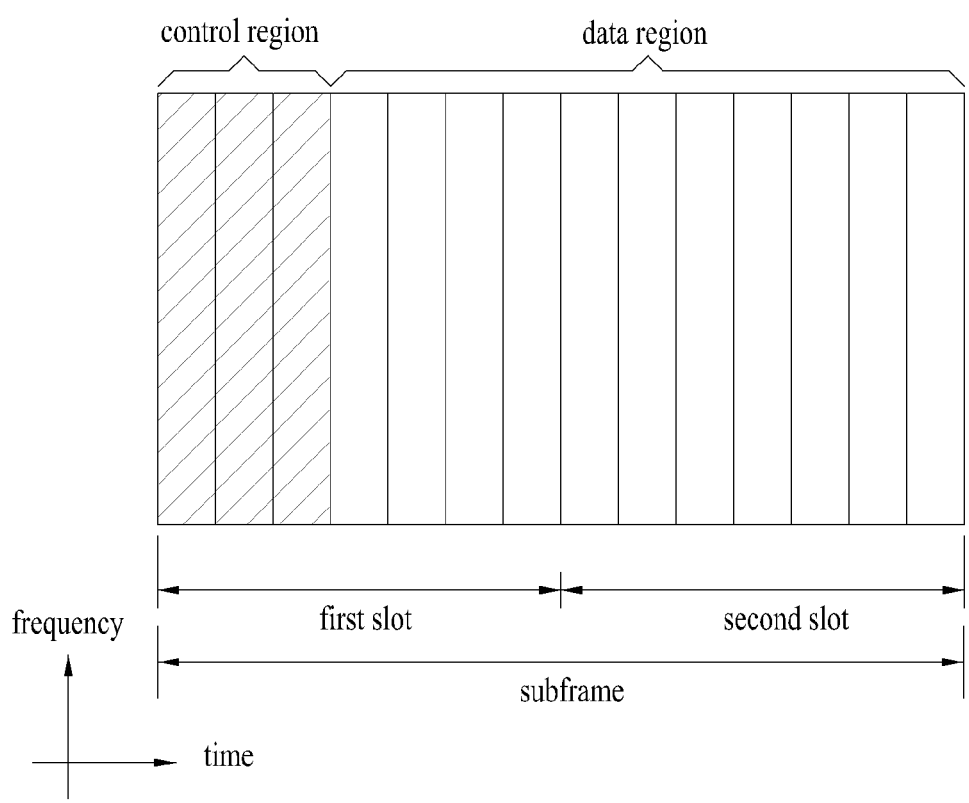
FIG. 6 is a diagram illustrating a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs), The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
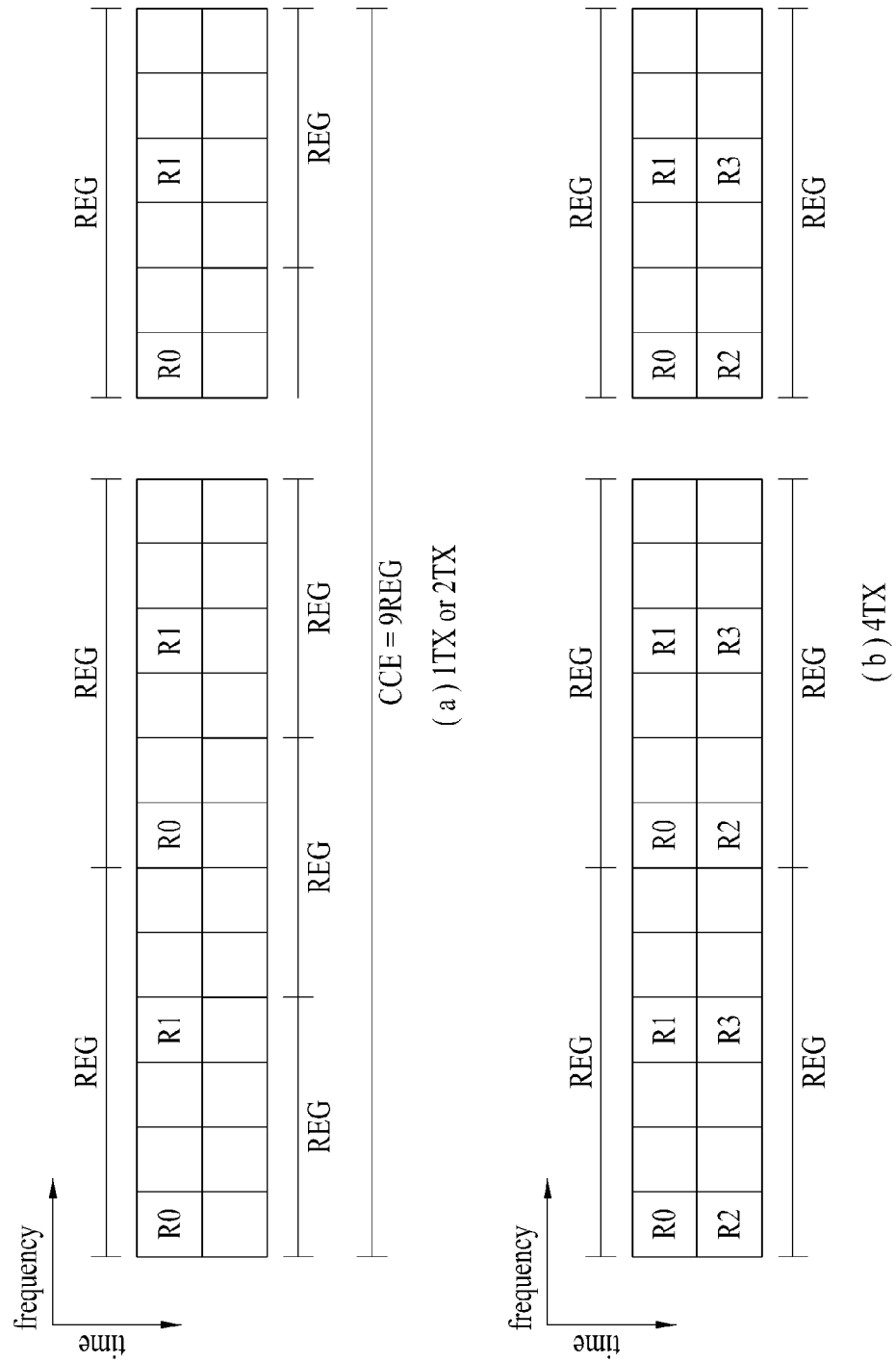
FIG. 7 is a diagram illustrating a resource unit used to configure a downlink control channel in an LTE system.

FIG. 7 is a diagram illustrating a resource unit used to configure a downlink control channel in an LTE system. In particular, FIG. 7(*a*) illustrates that the number of transmitting antennas is 1 or 2, and FIG. 7(*b*) illustrates that the number of transmitting antennas is 4. Although RS (Reference Signal) patterns of FIG. 7(*a*) and FIG. 7(*b*) are different from each other in accordance with the number of transmitting antennas, a configuration method of a resource unit related to a control channel is equally applied to FIG. 7(*a*) and FIG. 7(*b*).

Referring to FIG. 7, a basic resource unit for the downlink control channel is a resource element group (REG). The REG includes four neighboring resource elements excluding the reference signal (RS). The REG is illustrated with a solid line. The PCFICH and the PHICH include four REGs and three REGs, respectively. The PDCCH is configured in a unit of CCE (control channel element), one CCE including nine REGs.

The user equipment is configured to identify $M^{(L)}(\geq L)$ number of CCEs, which are continuous or arranged in accordance with a specific rule, thereby identifying whether PDCCH of L number of CCEs is transmitted thereto. A plurality of values of L may be considered by the user equipment to receive the PDCCH. CCE aggregations that should be identified by the user equipment to receive the PDCCH will be referred to as a search space. For example, the LTE system defines the search space as illustrated in Table 3 below.

TABLE 3

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In this case, CCE aggregation level L represents the number of CCEs constituting the PDCCH, $S_k^{(L)}$ represents a search space of the CCE aggregation level L, and $M^{(L)}$ is the number of candidate PDCCH that should be monitored at the search space of the aggregation level L.

The search space may be divided into a UE-specific search space that allows access for only a specific user equipment and a common search space that allows access for all user equipments within a cell. The user equipment monitors a common search space of the CCE aggregation levels of 4 and 8, and monitors a UE-specific search space of the CCE aggregation levels of 1, 2, 4 and 8. The common search space and the UE-specific search space may be overlapped with each other.

Furthermore, in a PDCCH search space given to a random user equipment for each CCE aggregation level value, the location of the first CCE (i.e., CCE having the smallest index) is varied per subframe depending on the user equipment. This will be referred to as PDCCH search space hashing.

The CCEs may be distributed in a system band. In more detail, a plurality of CCEs which are logically continuous may be input to an interleaver. The interleaver performs interleaving for the input CCEs in a unit of REG. Accordingly, frequency/time resources constituting one CCE are physically distributed in the entire frequency/time domain within the control region of the subframe. Finally, although the control channel is configured in a unit of CCE, interleaving is performed in a unit of REG, whereby frequency diversity and interference randomization gain may be maximized.

As described above, In the 3GPP LTE/LTE-A system, first n number of OFDM symbols of the subframe are used for transmission of PDCCH, PHICH, and PCFICH, which are physical channels for transmission of various kinds of control information, and the other OFDM symbols are used for PDSCH transmission. The number of symbols used for transmission of control channel at each subframe is forwarded to the user equipment dynamically through the physical channel such as PCFICH, or semi-statically through RRC signaling. The value of n may be set to one symbol to maximum four symbols in accordance with subframe features and system features (FDD/TDD, system band, etc.). Meanwhile, in the LTE system according to the related art, the PDCCH which is a physical channel for DL/UL scheduling and transmission of various kinds of control information has limitation in that the PDCCH is transmitted through limited OFDM symbol(s). Accordingly, instead of a control channel structure of the legacy PDCCH transmitted through OFDM symbols separated from the PDSCH, introduction of an enhanced PDCCH (E-PDCCH) multiplexed with the PDSCH more freely in accordance with FDM/TDM mode may be considered.

In case of the LTE system (Rel-8/9/10), a reference signal and a physical control channel are transmitted at a subframe set for a downlink on a specific cell or a component carrier (CC). Based on this, the legacy user equipments may be assured of physical downlink/uplink data channel transmission (that is, backward compatibility) performed through the specific cell. For example, the reference signal in the present invention may be, but not limited to, one of CRS, CSI-RS, and DM-RS, and the physical control channel may be, but not limited to, one of PDCCH, PCFICH, and PHICH.

However, in the future system, a cell or component carrier (CC), which is newly defined, may be introduced due to reasons such as improvement of inter-cell interference problem, improvement of extendibility of the cell or component carrier, and increase of degree of freedom in application of advanced technology. In other words, a cell or component carrier (CC) may be introduced, which is newly defined so as not to transmit all or some of physical channels or reference signals transmitted on a cell or component carrier (CC) having backward compatibility with the aforementioned legacy user equipment. In the present invention, for convenience of description, such a cell or component carrier (CC) will be defined as a new carrier type (NCT).

In other words, unlike the cell or component carrier (CC) which has compatibility with the legacy user equipment, in the NCT which is the newly defined cell or component carrier (CC), CRS transmission of high density may basically be omitted or reduced.

Also, in the NCT, physical channel reception and channel estimation operation may be performed on the basis of CSI-RS which may be set at relatively lower density than that of DM-RS transmitted UE-specifically or CRS transmission, whereby advantages such as reduction of overhead of the reference signal and improvement of physical channel reception performance may be obtained. For example, in the NCT, physical channel reception operation may be performed using downlink data transmission modes (for example, TM mode #8, TM mode #9) operated based on DM-RS among the conventional downlink data transmission modes (TMs).

Also, even in the NCT, synchronization signals (for example, PSS, SSS) for synchronization acquisition on time/frequency resource domains or various reference signals for channel estimation (for example, RRM, RLM) between the base station and the user equipment may be transmitted. For example, although the synchronization signal transmitted in the NCT may be implemented in the same structure as that of the synchronization signal on the legacy system, the synchronization signal may be implemented in another structure different from that of the synchronization signal on the legacy system.

Additionally, in the NCT, CRS may be transmitted for the purpose of synchronization signal demodulation. In this case, the corresponding CRS may be transmitted on the basis of at least one of a specific period which is previously set, a specific location on the frequency domain, a resource on a specific antenna port, and a specific sequence resource. For example, the CRS transmitted for the purpose of synchronization signal demodulation may be defined so as not to be used for demodulation of a physical control channel or a physical data channel.

Figure 8:
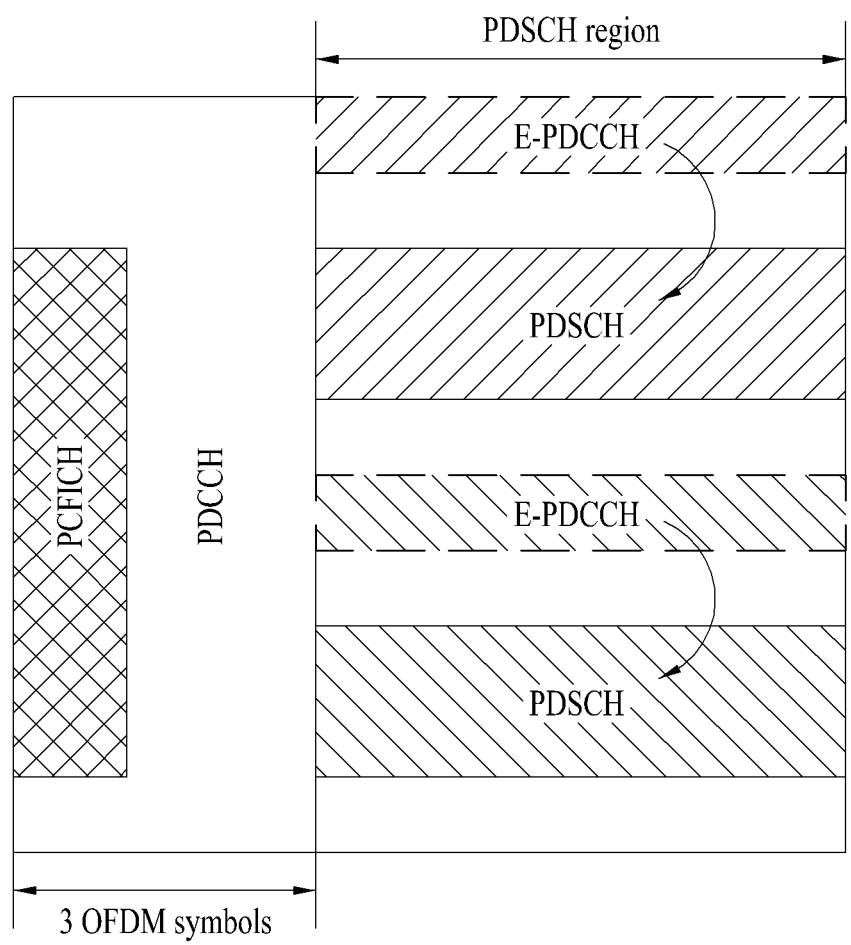
FIG. 8 is a diagram illustrating an example of an EPDCCH and a PDSCH scheduled by the EPDCCH.

FIG. 8 is a diagram illustrating an example of an EPDCCH and a PDSCH scheduled by the EPDCCH.

Referring to FIG. 8, the EPDCCH may be used by partially defining a PDSCH region for transmitting data, and the user equipment should perform a blind decoding procedure for detecting its EPDCCH. Although the EPDCCH performs the same scheduling operation (that is, PDSCH and PUSCH control) as that of the conventional PDCCH, a greater number of EPDCCHs may be allocated to the PDSCH region if the number of user equipments which have accessed the same node as that of RRH. In this case, the number of times for blinding decoding that should be performed by the user equipment may be increased, whereby a problem may exist in that complexity may be increased.

Based on the aforementioned description, the present invention suggests a method for effectively transmitting an enhanced downlink control channel (EPDCCH) at a specific subframe (SF) of a new carrier type (NCT). Although a carrier backward compatible with a carrier type of Rel. 8 or 9 is considered in the LTE Release 10, discussion for introduction of non-compatible carrier, that is, NCT, which may fundamentally solve interference problem or extendibility problem, is in progress in the future LTE system.

As described above, since the PDCCH or some reference signal (RS) is not used in the NCT, it is required that channel allocation or transmission mode should be different from that of the legacy Rel. 10. Accordingly, the present invention suggests a method for effectively transmitting an EPDCCH when there is restriction of available resources at some subframe not normal subframe (SF), among subframes of the NCT, or collision between different signals occurs.

The EPDCCH is transmitted from the PDSCH region, and the number of available OFDM symbols or the number of available resources may be limited at a specific subframe for a special reason. For example, DwPTS of the special subframe in the TDD system may be limited to use first three symbols only in accordance with configuration. For another example, if a positioning reference signal (PRS) exists at a subframe of the NCT, the PRS is subjected to mapping from the fourth symbol, whereby the region that may be used as the EPDCCH is limited to first three symbols. For another example, since the other symbols except first two OFDM symbols are used for a physical multicast channel (PMCH)

at a subframe to which the PMCH is transmitted, the first two OFDM symbols may be used to transmit the EPDCCH.

Accordingly, the present invention suggests that EPDCCH PRB set should be extended to a wider PRB set or a full system band to complement the resource of the EPDCCH, which is limited to some OFDM symbols under the condition that the EPDCCH is transmitted even at a specific subframe of the NCT, which has a restrictive number of available OFDM symbols. Moreover, the base station eNB may notify the user equipment of OFDM symbol, which will be used for the EPDCCH at the corresponding subframe, through a higher layer signal.

In the EPDCCH, among the full system band, some PRB set which is previously determined may be indicated through RRC signaling, whereby the EPDCCH may be detected from the indicated PRB set. However, it is required that EPDCCH PRB set different from EPDCCH PRB set of a normal subframe should be used at the specific subframe of the NCT due to restriction of available resources or restriction of the number of available OFDM symbols.

In other words, such a new EPDCH PRB set may include PRBs more than those of the PRB set of the normal frame, or may be the set that uses a full band of the user equipment. At this time, although the EPDCCH operation may follow the existing operation based on two modes, that is, localized mode and distributed mode, since it is difficult to obtain precoding gain intended by the localized operation if a signal is widely allocated on a frequency axis by using a small number of OFDM symbols, the EPDCCH operation may be performed using the distributed mode only without using the localized mode. In other words, even though the user equipment is designated to use the localized mode at a normal subframe, the EPDCCH operation mode is shifted to the distributed mode at a specific subframe having the aforementioned restriction of available resources (that is, DwPTS, PRS, PMCH, etc.).

In the present invention, if the mode is shifted automatically, DM-RS antenna port allocated to each EPDCCH resource element (RE) may follow allocation of the distributed mode but antenna port allocation may maintain the localized mode. The user equipment may be configured to previously identify OFDM symbol, into which the EPDCCH is mapped at the corresponding subframe, through a higher layer signal (for example, RRC signal).

For example, the case where the present invention is applied to DwPTS of a special subframe configuration #0 in the TDD will be described. Although the DwPTS may be configured in various manners, the DwPTS may be configured to include three OFDM symbols at the specific subframe configuration #0. That is, 14 symbols are used at a normal subframe, whereas three symbols (3/14=21.4%) are only used at the DwPTS to transmit the EPDCCH. Accordingly, it is preferable that the EPDCCH set of the DwPTS includes PRB pairs more than those of the EPDCCH set of the normal subframe.

If the user equipment uses four PRB pairs as the EPDCCH set at the normal subframe (SF), it is preferable that the EPDCCH set of N(N>4) number of PRB pairs is received at the DwPTS, wherein N is a random number greater than 4 (size of the EPDCCH PRB set of the normal subframe) and may be defined previously. For example, if the size of the EPDCCH set of the normal subframe is 4, additional PRB pairs may further be allocated in the form of $4+K_L$ (that is, different kinds of k are allowed in accordance with aggregation level L), or the number of total resource elements may similarly be maintained in the form of 4k (k is a value obtained by proper integer operation such as round/round-up/round-down value by dividing total symbols by available symbol value).

At this time, the base station eNB may transmit the number (that is, 3 in this embodiment) of symbols used for EPDCCH, the number (N in this embodiment) of PRB pairs that belong to the EPDCCH PRB set, and info, illation on location of each PRB pair to the user equipment through a higher layer signal (for example, RRC signal). Some of these kinds of information may be omitted. For example, if the user equipment may estimate the size of the PRB set from the number of OFDM symbols used for EPDCCH, size information of the PRB set may be omitted.

Also, the present invention suggests two methods indicating the location of the PRB set. First, the base station may be configured to transmit location information only on additional PRB on the basis of distribution of the PRB set of the normal subframe (SF). Second, the base station may be configured to transmit start PRB index, and the user equipment may be configured to distribute the PRB set uniformly for the full system band on the basis of the received start PRB index or at an interval which is previously defined. In this way, if the PRB set is distributed uniformly for the full system band, the localized ECCE may be configured in such a manner that one ECCE belongs to one PRB in the same manner as the normal subframe. On the other hand, the ECCE may be distributed in the total EPDCCH set in the same manner as the distributed ECCE. That is, one ECCE may be distributed uniformly in the total PRB set.

Meanwhile, since the other resource except the EPDCCH little remains at the DwPTS, it may be difficult to transmit a channel (for example, PDSCH) for another purpose of use. Accordingly, in more advanced aspect of the present invention, the full system band may be configured to be automatically used as the EPDCCH PRB set at the DwPTS. In this case, separate signaling for designating the EPDCCH PRB set at the corresponding subframe will not be required. Likewise, the full system band may be configured to be automatically used as the EPDCCH PRB set at the subframe to which the PMCH or the PRS is transmitted. Alternatively, the full system band may be configured to be automatically used as the EPDCCH PRB set at the subframe previously designated by the base station through a higher layer signal.

Also, as described above, to transmit the EPDCCH at the specific subframe, the EPDCCH may be transmitted together with the DM-RS. Accordingly, in order to apply the existing DM-RS to the specific subframe of the NCT, proper change may be required. An example of the proper change is the change of resource location for transmission of the DM-RS. Particularly, the DM-RS resource location may be affected by the number of OFDM symbols used to transmit the EPDCCH at the specific subframe.

Figure 9:
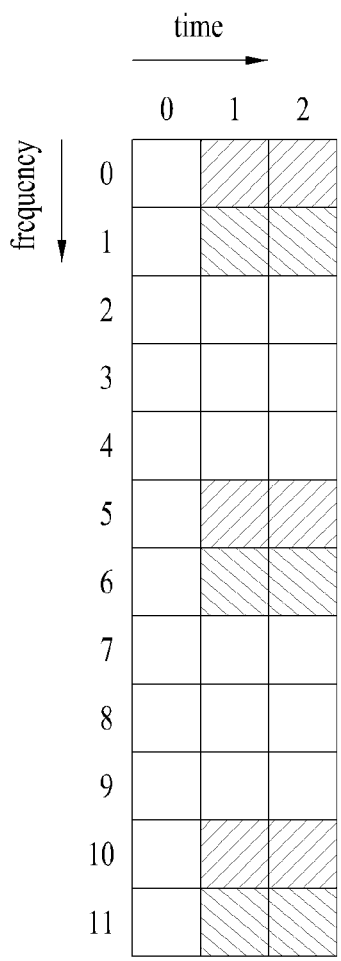
FIG. 9 is a diagram illustrating DM-RS allocation at a subframe to which the number of OFDM symbols is limited in accordance with one embodiment of the present invention.
Figure 9:
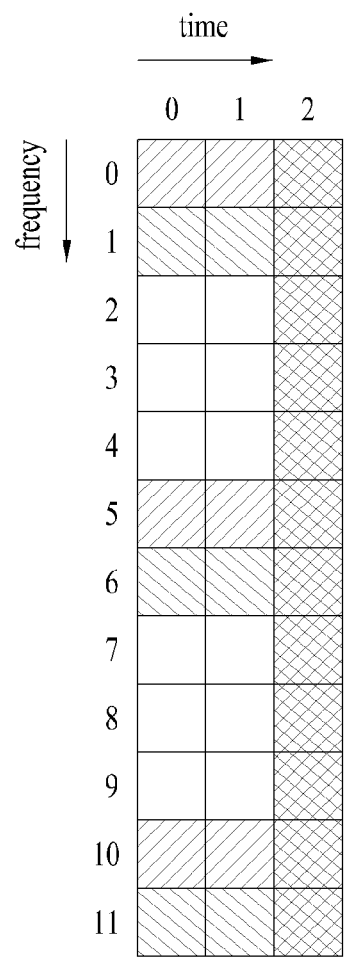

FIG. 9 is a reference diagram illustrating a method for mapping DM-RS at a specific subframe. For example, as shown in FIG. 9(a), if three OFDM symbols are used for the EPDCCH, in order to avoid the CRS that may be transmitted at the OFDM symbol #0 (that is, DwPTS that uses three OFDM symbols), a pair of ports may be subjected to mapping by using OFDM symbols #1 and #2 (for example, in accordance with a CDM mode). If the same port as that of the PDSCH is shared, port {7, 8} and port {9, 10} may be subjected to mapping (for example, in accordance with a CDM mode).

On the other hand, if a data channel and a port are identified from each other, new four ports may be matched with one another in pairs and then may be subjected to mapping. However, if two OFDM symbols are used for the EPDCCH (for example, if the PMCH is transmitted), since the OFDM symbol #2 cannot be used, the DM-RS may be transmitted using the OFDM symbols #0 and #1 as shown in FIG. 9(b). Also, since three OFDM symbols are available in case of the subframe to which the PRS is transmitted, the OFDM symbol {#1, #2} may be used as shown in FIG. 9(a), or the OFDM symbol {#0, #1} may be used as shown in FIG. 9(b). Moreover, only one common pattern that may be applied to a plurality of cases may be defined for the DM-RS. In other words, as shown in FIG. 9(b), the OFDM symbols #0 and #1 may commonly be used on the subframe to which limitation based on the PMCH or the PRS is applied. By contrast, as shown in FIG. 9(a), the OFDM symbols #1 and #2 may commonly be used on the subframe to which limitation based on the DwPTS or the PRS is applied.

Moreover, in performing the aforementioned operation, it may be difficult for the UE to identify how many OFDM symbols are used for EPDCCH transmission. Particularly, such a problem may occur in the UE having no ability to identify the subframe to which the PMCH or the PRS is transmitted. Accordingly, the base station eNB may notify the UE of a subframe at which the EPDCCH is transmitted using a very small number of OFDM symbols, through a higher layer signal, and at the same time may notify the UE of the number of OFDM symbols used for EPDCCH transmission at each subframe or the index of the OFDM symbol through which EPDCCH transmission ends.

In the meantime, all the OFDM symbols may be used for the EPDCCH of the user equipment at the PRB pair to which the PRS is transmitted, without limitation to some OFDM symbol. Since the PRS is transmitted from some resource element (RE) only, the base station eNB may notify the UE of information indicating that a special subframe is the subframe to which the PRS is transmitted and pattern information $N^{PRS}_{RB}$, $v_{shift}$ of the PRS through a higher layer signal (for example, RRC signal), and may transmit the EPDCCH to the UE by using total PRB pairs. In this case, since the PRS and the DM-RS may collide with each other at the same resource element (RE), in order to avoid such collision, it is required to re-adjust the location of the DM-RS.

Figure 10:
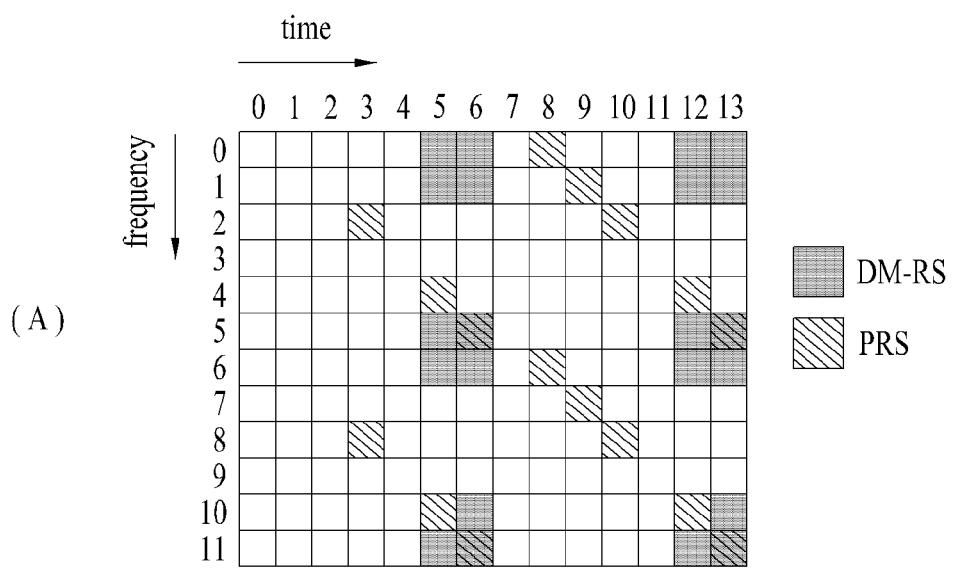
FIG. 10 is a diagram illustrating an example that PRS and DM-RS are allocated together in accordance with the embodiment of the present invention.
Figure 10:
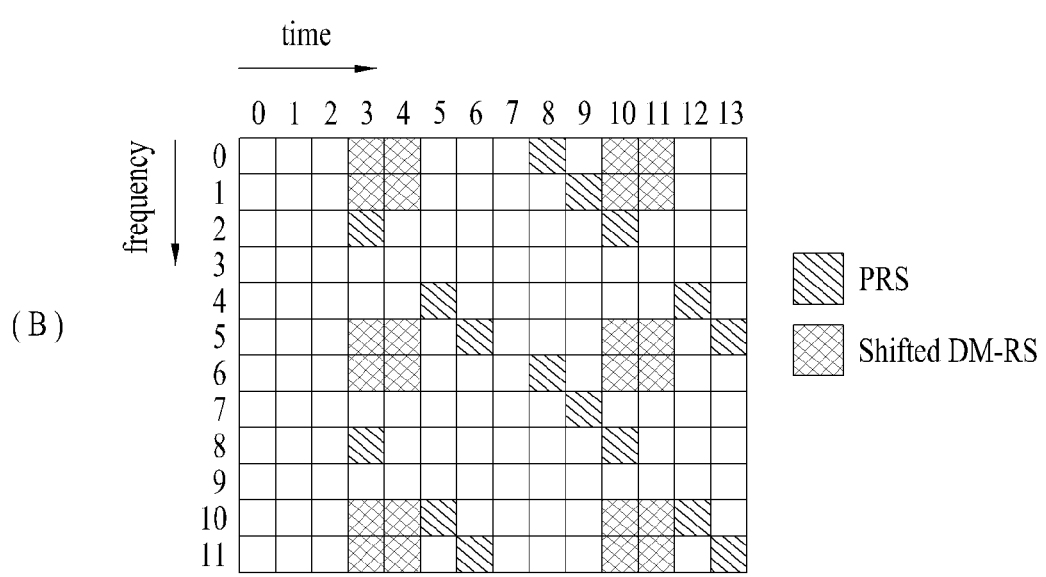

FIG. 10 is a reference diagram illustrating that DM-RS and PRS are arranged together at an LTE Rel. 10 environment. Referring to FIG. 10(a), when DM-RS ports 7, 8, 9 and 10 and one PBCH port are used and $v_{shift}$ is 0, resource collision occurs.

In other words, in order to avoid the status of FIG. 10(a), in the present invention, the DM-RS may be allocated to another resource element (RE) at the subframe to which the PRS of the NCT is transmitted. For example, as shown in FIG. 10(b), the location of the DM-RS may be shifted to a time axis as much as two symbols without separate configuration. At this time, as one example for allocating the EPDCCH, the EPDCCH and the PRS may be allocated to the total PRB pairs by considering the shifted DM-RS only, and the EPDCCH of the overlapped resource elements may be punctured. Alternatively, as another example, the location of the PRS may be considered previously, whereby the EPDCCH may be allocated without overlapping the locations of the DM-RS and the PRS (rate matching around DM-RS & PRS).

Figure 11:
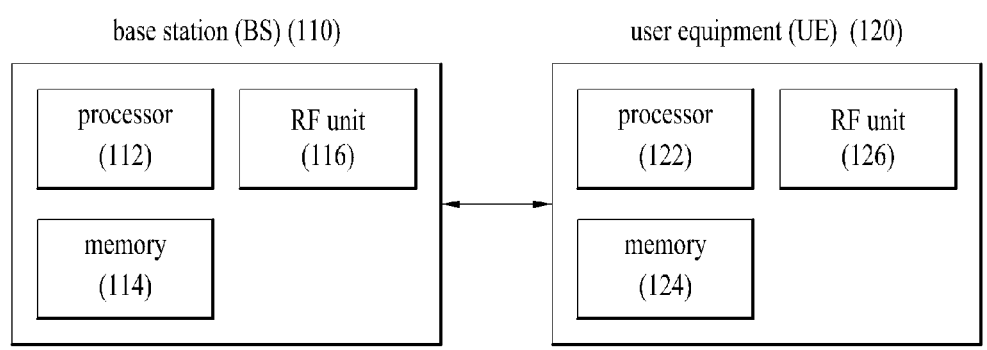
FIG. 11 is a diagram illustrating a base station and a user equipment, which may be applied to the embodiment of the present invention.

FIG. 11 is a diagram illustrating a base station and a user equipment, which may be applied to the embodiment of the present invention. If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 11, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for receiving enhanced downlink control information in a wireless communication system and the apparatus for the same have been described based on the 3GPP LTE system, the method and apparatus may be applied to various wireless communication systems in addition to the 3GPP LTE system.

The invention claimed is:

1. A method of receiving downlink control information by a user equipment in a wireless communication system, the method comprising:

receiving, by a user equipment, information related to a specific subframe for an enhanced physical downlink control channel (EPDCCH); and receiving, by a user equipment, at least a part of the downlink control information by monitoring a number of resource blocks determined in accordance with available resource regions of the specific subframe, wherein, when the specific subframe is a special subframe, the available resource regions are restricted to a downlink pilot time slot (DwPTS) of the special subframe and a number of physical resource block pairs for the EPDCCH is greater than a number of physical resource block pairs for the EPDCCH when the specific subframe is a normal subframe.

2. The method according to claim 1, wherein the information related to the specific subframe is received through higher layer signaling.

3. The method according to claim 1, wherein, when the resource regions are restricted to the DwPTS, the physical resource block pairs for the EPDCCH are configured in accordance with a distributed mode.

4. The method according to claim 3, wherein antenna ports allocated in association with the physical resource block pairs are configured in accordance with a localized mode.

5. The method according to claim 3, wherein antenna ports allocated in association with the physical resource block pairs are configured in accordance with a distributed mode.

6. The method according to claim 1, wherein the number of the physical resource block pairs is additionally increased on the basis of a predetermined value defined in accordance with an aggregation level if the available resource regions are restricted to the DwPTS.

7. The method according to claim 1, wherein the number of the physical resource block pairs is increased to a multiple of a number of available orthogonal frequency division multiplexing (OFDM) symbols of the available resource regions if the available resource regions are restricted.

8. The method according to claim 1, wherein the information related to the specific subframe includes at least one of a number of orthogonal frequency division multiplexing (OFDM) symbols for the EPDCCH, the number of the physical resource block pairs, and locations of the physical resource block pairs.

9. The method according to claim 1, wherein a location of a demodulation reference signal (DM-RS) at the specific subframe number is changed if the available resource regions are restricted to the DwPTS.

10. The method according to claim 1, wherein the available resource regions include at least one orthogonal frequency division multiplexing (OFDM) symbol.

11. A user equipment for receiving downlink control information in a wireless communication system, the user equipment comprising:

a radio frequency (RF) unit; and a processor operably coupled to the RF unit, wherein the processor is configured to:

receive information on a specific subframe for an enhanced physical downlink control channel (EPDCCH), and receive at least a part of the downlink control information by monitoring a number of resource blocks determined in accordance with available resource regions of the specific subframe, wherein, when the specific subframe is a special subframe, the available resource regions are restricted to a downlink pilot time slot (DwPTS) of the special subframe and a number of physical resource block pairs for the EPDCCH is greater than a number of physical resource block pairs for the EPDCCH when the specific subframe is a normal subframe.

* * * * *